(12) United States Patent
Jung et al.

(10) Patent No.: US 7,605,805 B2
(45) Date of Patent: Oct. 20, 2009

(54) ELECTRICAL TOUCH SENSOR AND HUMAN INTERFACE DEVICE USING THE SAME

(75) Inventors: Deok-Young Jung, Yongin-si (KR); Jae-Surk Hong, Yongin-si (KR); Young-Ho Shin, Yongin-si (KR)

(73) Assignee: Atlab Inc. (KR)

( * ) Notice: Subject to any disclaimer, the term of this patent is extended or adjusted under 35 U.S.C. 154(b) by 703 days.

(21) Appl. No.: 11/145,332

(22) Filed: Jun. 3, 2005

(65) Prior Publication Data
US 2006/0007181 A1    Jan. 12, 2006

(30) Foreign Application Priority Data
Jun. 3, 2004    (KR) ..................... 10-2004-0040537
Mar. 21, 2005    (KR) ..................... 10-2005-0023382

(51) Int. Cl.
*G09G 5/00*    (2006.01)
(52) U.S. Cl. ................. 345/173; 178/18.03; 178/18.06; 178/19.03; 178/20.01; 178/20.04; 324/76.39; 324/76.41; 324/76.61; 324/418; 341/20; 341/22; 341/33; 361/288; 361/290; 382/124
(58) Field of Classification Search ......... 345/173–179; 341/33; 463/22–23; 178/18.01, 18.03, 18.05, 178/18.06, 19.03, 19.07, 20.01, 20.04; 340/712, 340/365 C, 365 S; 324/76.39, 76.41, 76.61, 324/76.77, 418, 423; 382/124; 361/288, 361/290
See application file for complete search history.

(56) References Cited
U.S. PATENT DOCUMENTS

| | | | | |
|---|---|---|---|---|
| 4,550,310 A | * | 10/1985 | Yamaguchi et al. | 307/99 |
| 5,016,008 A | * | 5/1991 | Gruaz et al. | 341/33 |
| 5,543,588 A | * | 8/1996 | Bisset et al. | 178/18.06 |
| 5,734,787 A | * | 3/1998 | Yonemitsu et al. | 386/111 |
| 7,006,078 B2 | * | 2/2006 | Kim | 345/173 |
| 7,109,987 B2 | * | 9/2006 | Goel et al. | 345/423 |

* cited by examiner

*Primary Examiner*—Henry N Tran
(74) *Attorney, Agent, or Firm*—Cantor Colburn LLP

(57) ABSTRACT

An electrical touch sensor is provided. The electrical touch sensor includes: a touch detection part having at least one touch pad and generating a first signal having a same delay time regardless of whether the object is in contact with the touch pad and a second signal having a varied delay time according to whether the object is in contact with the touch pad; and a contact signal generator generating a contact signal in response to the delay time-difference between the first and second signals.

Therefore, it is possible to increase operation reliability by precisely determining whether the object is in contact with the pad, when the object has charge accumulation characteristics more than a certain level, although its conductive is insufficient. In addition, the electrical touch sensor can determine whether the object is in contact with the pad using only one pad to reduce a layout area of a product.

23 Claims, 22 Drawing Sheets

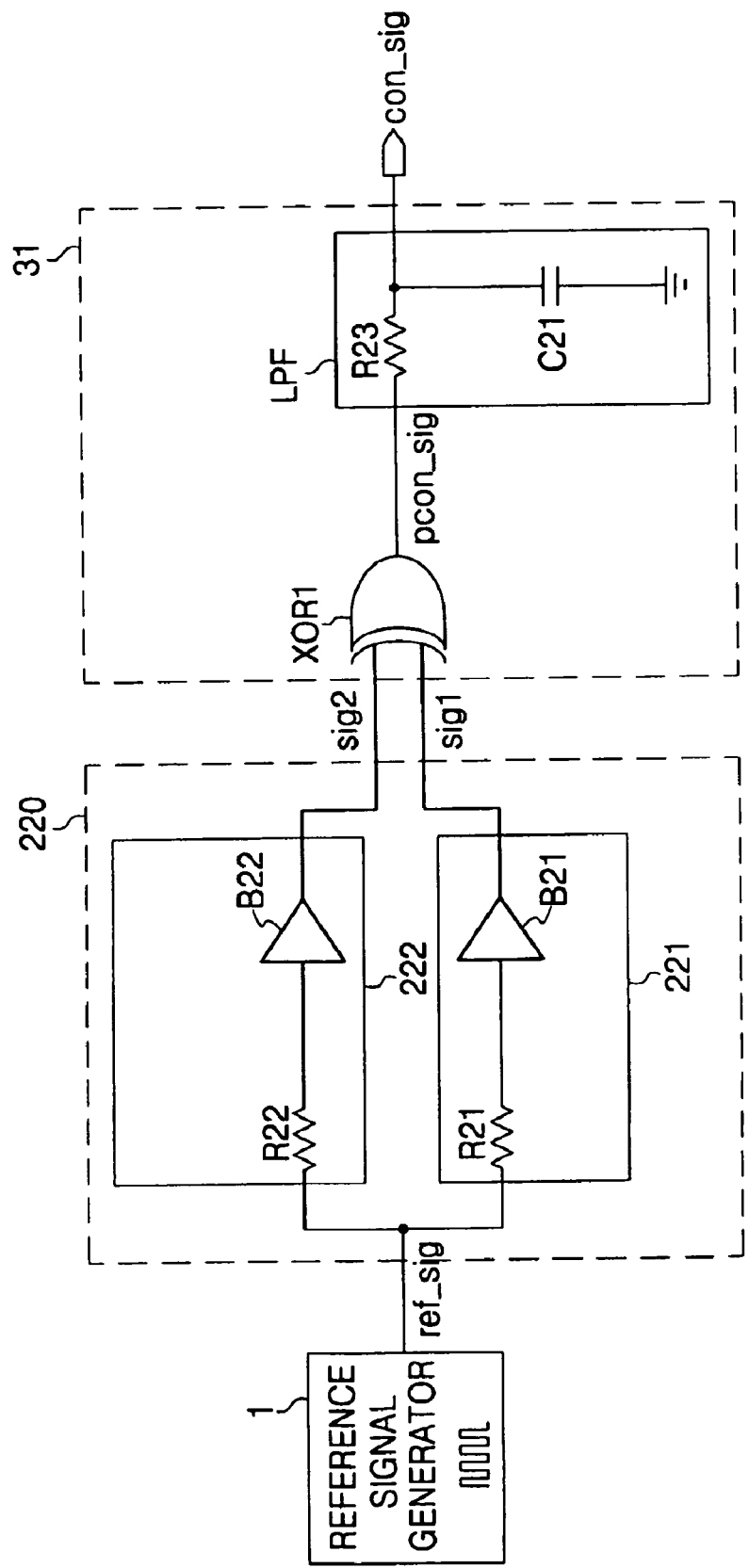

ELECTRICAL TOUCH SENSOR AND HUMAN INTERFACE DEVICE USING THE SAME

This U.S. nonprovisional patent application claims priority under 35 U.S.C. § 119 of Korean Patent Application 2004-40537 filed on Jun. 3, 2004, and Korean Patent Application 2005-23382 filed on Apr. 21, 2005, the entire contents of which are hereby incorporated by reference.

BACKGROUND OF THE INVENTION

1. Field of the Invention

The present invention relates to a touch sensor and, more particularly, to an electrical touch sensor for electrically detecting whether an object is touched and informing the result and a human interface device using the same.

2. Description of Related Art

Generally, a touch sensor is classified into a push button operated in a mechanical manner, and an electrical touch sensor operated in a non-mechanical manner.

The push button requires a mechanical contact for detecting whether an object pushes a button, and a spring device for turning the button back, to make it difficult to minimize the resultant product and make its structure complicated, while its manufacturing cost is inexpensive. On the other hand, the electrical touch sensor is advantageous to minimize the product, while its manufacturing cost is more expensive than the push button.

The present invention is especially directed to the electrical touch sensor.

FIGS. 1A to 1C are views illustrating a circuit diagram of a conventional electrical touch sensor.

FIG. 1A is a basic circuit diagram of the electrical touch sensor, FIG. 1B is an operating circuit diagram of the electrical touch sensor when a contact object is not in contact with the sensor, and FIG. 1C is an operating circuit diagram when the contact object is in contact with the sensor.

Referring to FIG. 1A, the electrical touch sensor includes two touch pads (or touch pins) PAD1 and PAD2 for touching an object, a first resistor R1 for protecting an inner circuit from static electricity transmitted from the object, an active device N-type FET Q1, a second resistor R2 for determining a bias voltage of the N-type FET Q1, a third resistor RL for acting as a load of the N-type FET Q1, and an output buffer for buffering an output voltage of the N-type FET Q1.

When the object is not in contact with the electrical touch sensor, as shown in FIG. 1B, the touch pads PAD1 and PAD2 are opened, and therefore, a gate of the N-type FET Q1 is connected to a ground voltage through the second resistor R2.

The N-type FET Q1, through which the ground voltage and the gate are connected, turns off, and no current flows through the N-type FET Q1 and the third resistor RL. Therefore, a power source voltage VDD is applied to a drain of the N-type FET Q1, and the output buffer B1 receives the power source voltage VDD applied to the drain of the N-type FET Q1 to output a high level of signals.

On the other hand, when the object is in contact with the electrical touch sensor, the electrical touch sensor has the operating circuit diagram of FIG. 1C.

At this time, generally, the object may be a human's finger which is resistance having conductivity.

Referring to FIG. 1C, the two touch pads PAD1 and PAD2 are connected through a resistance RH, through which current generated by voltage difference of the power source voltage VDD and the ground voltage VGND flows. Hereinafter, the resistance RH of the human in contact with the touch pads is referred to as a fourth resistor RH.

As a result, a voltage of "VDD×R2/(R1+R2+RH)" is applied to the gate of the N-type FET Q1.

In addition, when the voltage applied to the gate of the N-type FET Q1 is larger than a threshold voltage Vth of the N-type FET Q1, the N-type FET Q1 turns on so that drain current IL of "A×(VG−Vth)$^2$" flows through the N-type FET Q1 and the third resistor RL. Here, A is a specific constant of a FET, VG is a gate voltage of a FET, and Vth is a threshold voltage of a FET, That is, a voltage VD of "VDD−IL×RL" is applied to the drain of the N-type FET Q1.

Especially, when a voltage to flow the drain current IL calculated as "IL×RL>VDD" is applied to the gate of the N-type FET Q1, the drain voltage of the N-type FET Q1 becomes "0".

As described above, when an object having a very small resistor value is in contact with the two touch pads PAD1 and PAD2, a drain voltage having an approximately "0" value is generated in the drain of the N-type FET Q1 to be outputted as a low level of signals through the output buffer B1.

The conventional electrical touch sensor includes the two touch pads to electrically detect whether the object having conductivity is in contact with both of the two touch pads, thereby outputting signals corresponding to the detected result.

While the conventional electrical touch sensor is applicable to various electric/electronic devices by converting only an electrical contact to an electrical signal, without mechanical components, the two touch pads should be required in order to detect whether the object is in contact with the sensor.

Therefore, it is difficult to minimize the conventional electrical touch sensor since it should have the two touch pads.

In addition, since the conventional electrical touch sensor detects whether the object is in contacted with the touch pads using a resistor generated from a human body and so on, the object should have a certain resistance.

When the object has insufficient conductivity, i.e., when a user wears gloves having no conductivity, or when the user's hand is dry, though the user's finger touches the electrical pads, the electrical touch sensor generates output signals as shown in FIG. 2.

That is, when the object has insufficient conductivity, though the object is in contact with the touch pads PAD1 and PAD2 (sections 1 and 3), the touch pads PAD1 and PAD 2 are in the same state that a very high resistor is connected to the touch pads PAD1 and PAD2. As a result, a minor current is applied to gate terminal of the N-type FET Q1 to make the electrical touch sensor generate a high level of signals.

As described above, in the case of the conventional electrical touch sensor, when the object has insufficient conductivity though the object is in contact with the pads, the electrical touch sensor may not detect the contact to be malfunctioned.

SUMMARY OF THE INVENTION

Therefore, to solve the problem described hereinabove, an object of the present invention is to provide an electrical touch sensor capable of precisely detecting whether an object is in contact with the sensor, when the object has charge accumulation characteristics, in spite of insufficient conductivity.

Another object of the present invention is to provide an electrical touch sensor capable of detecting whether an object is in contact with the sensor, using only one touch pad.

Still another object of the present invention is to provide a human interface device using an electrical touch sensor.

An electrical touch sensor in accordance with a present invention includes:

a touch detection part having at least one touch pad and generating a first signal having a same delay time regardless of whether the object is in contact with the touch pad and a second signal having a varied delay time according to whether the object is in contact with the touch pad; and a contact signal generator generating a contact signal in response to the delay time-difference between the first and second signals.

A human interface sensor in accordance with a first embodiment of the present invention includes: at least one electrical touch sensor having a touch pad and generating a contact signal depending on whether an object is in contact with the touch pad; and a controller performing a power control operation in response to the contact signal, wherein the at least one electrical touch sensor comprises: a touch detection part having at least one touch pad and changing a delay time-difference between first and second signals depending on whether an object is in contact with the touch pad; and a contact signal generator generating a contact signal in response to the delay time-difference between the first and second signals.

A human interface sensor in accordance with a second embodiment of the present invention includes: a display part displaying data on a screen; an electrical scroll device having a plurality of touch pads disposed in a predetermined pattern and generating at least one contact signal when an object is in contact with at least one touch pad of the touch pads; and a controller analyzing the contact signal to detect positions of the touch pads in contact with the object, and scrolling the screen in a direction corresponding to the positions of the touch pads, wherein the electrical scroll device comprises a plurality of electrical touch sensors having the touch pad and respectively generating a contact signal when the object is in contact with the touch pad.

BRIEF DESCRIPTION OF THE DRAWINGS

The foregoing and other objects, features and advantages of the invention will be apparent from the more particular description of a preferred embodiment of the invention, as illustrated in the accompanying drawing. The drawing is not necessarily to scale, emphasis instead being placed upon illustrating the principles of the invention.

FIG. 7A is an operating circuit diagram illustrating the electrical touch sensor of FIG. 6, when an object is not in contact with the sensor;

DETAILED DESCRIPTION OF THE INVENTION

Hereinafter, the detailed description of a preferred embodiment in accordance with the present invention will be apparent in connection with the accompanying drawings.

Figure 1A:
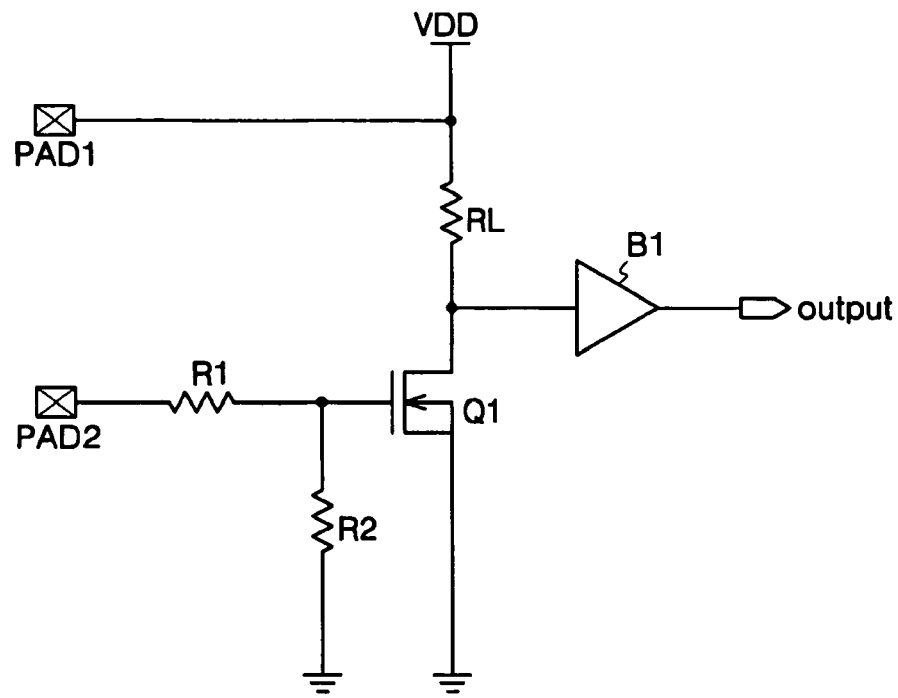
FIG. 1A is a circuit diagram illustrating a conventional electrical touch sensor.
Figure 1B:
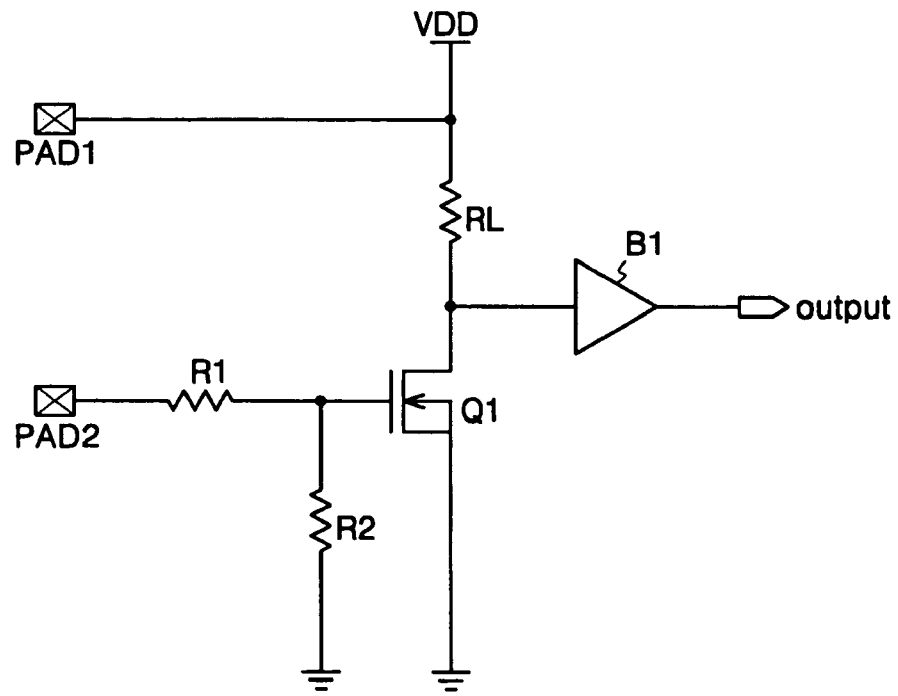
FIG. 1B is an operating circuit diagram illustrating the electrical touch sensor of FIG. 1A, when an object is not in contact with the sensor.
Figure 1C:
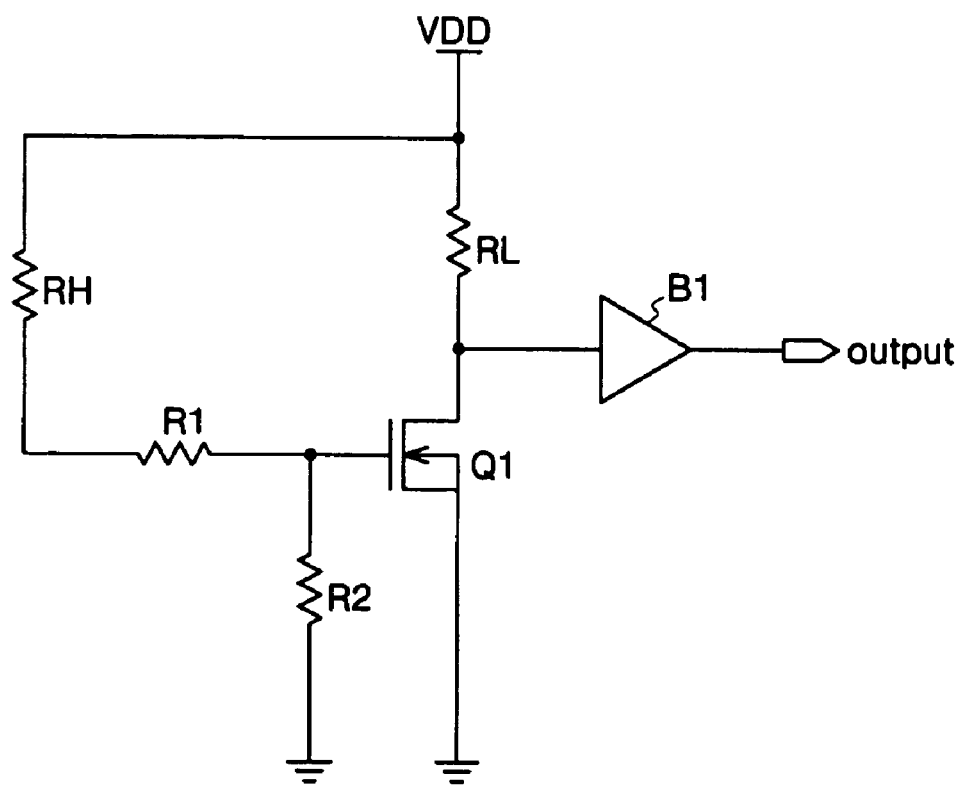
FIG. 1C is an operating circuit diagram illustrating the electrical touch sensor of FIG. 1A, when an object is in contact with the sensor.
Figure 2:
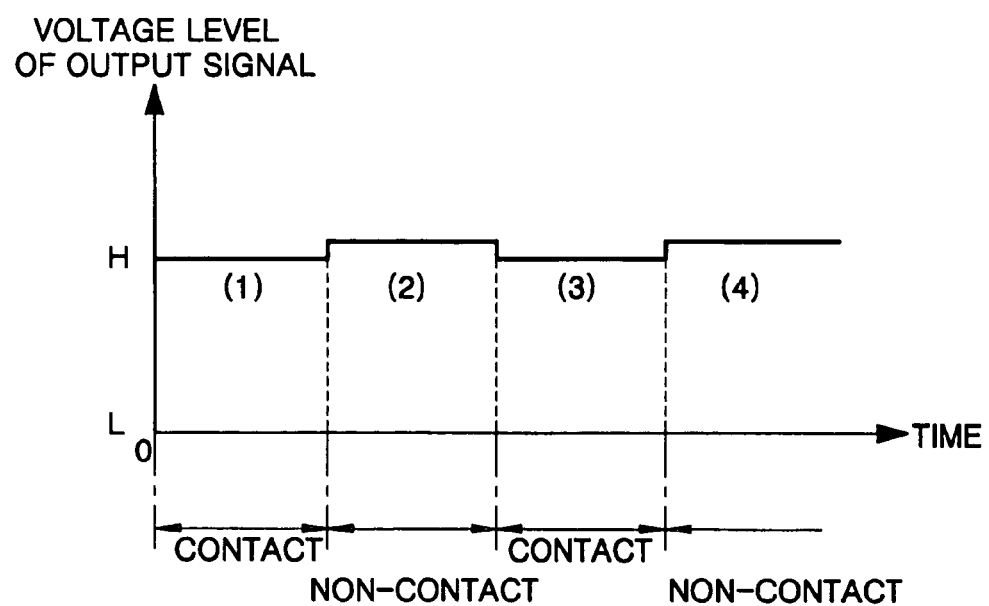
FIG. 2 is a view illustrating output level variations of the electrical touch sensor of FIG. 1A, when an object is in contact with the sensor or not.
Figure 3:
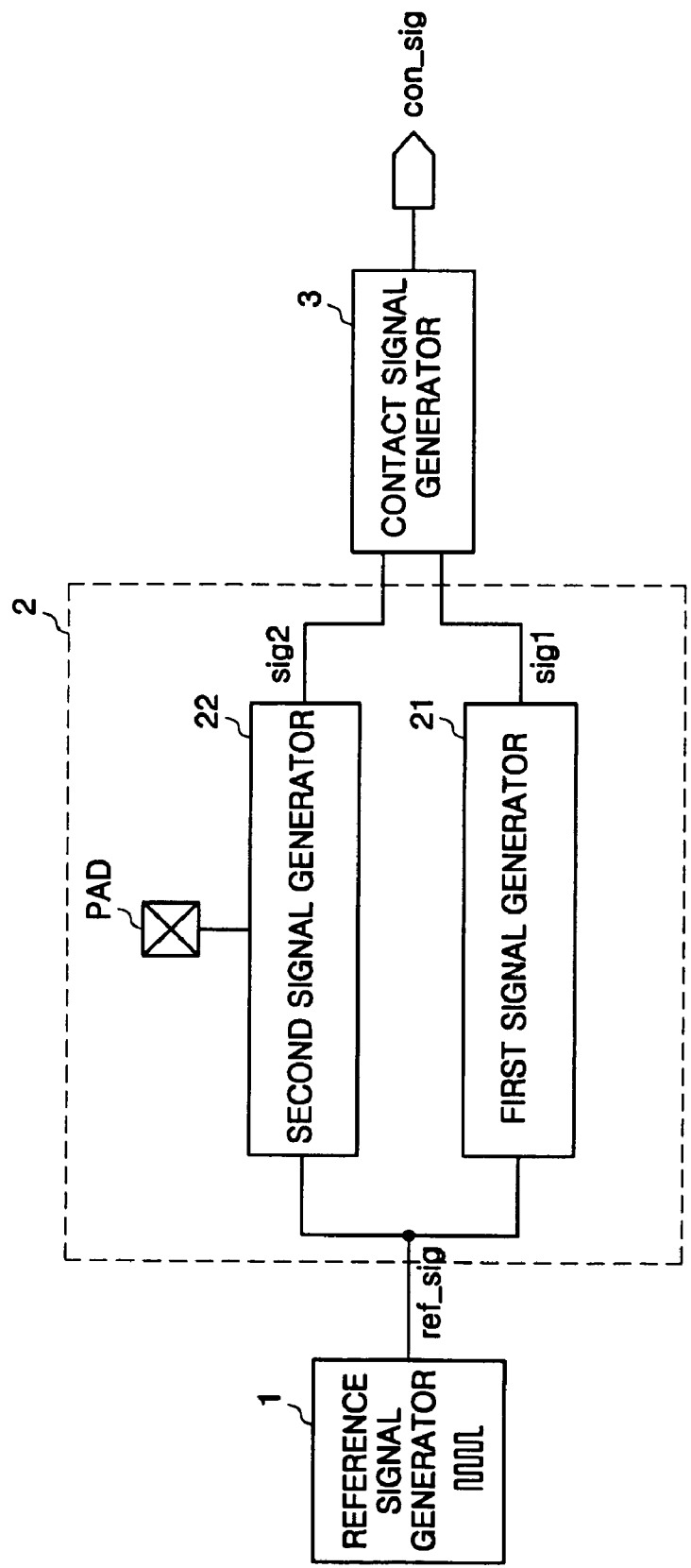
FIG. 3 is a block diagram illustrating of an electrical touch sensor in accordance with the present invention.

FIG. 3 is a block diagram illustrating of an electrical touch sensor in accordance with the present invention.

As shown in FIG. 3, the electrical touch sensor of the present invention includes a reference signal generator 1, a touch detection part 2 having first and second signal generators 21 and 22, and a contact signal generator 3.

Hereinafter, function of each component will be described.

The reference signal generator 1 generates an AC (alternate current) signal or a clock signal as a reference signal to apply it to the touch detection part 2.

The touch detection part 2 varies a delay time-difference between first and second signals sig1 and sig2 depending on whether an object is in contact with the sensor. For this purpose, the first signal generator 21 generates the first signal sig1 by always delaying the reference signal ref_sig by a first time regardless of whether the object is in contact with the sensor. The second signal generator 22 includes a touch pad PAD, when the object is in contact with the touch pad PAD, the reference signal ref_sig is delayed longer(or shorter) than the first time t1, and when the object is not in contact with the touch pad PAD, the reference signal ref_sig is delayed shorter (or longer) than the first time t1 to generate the second signal sig2.

The contact signal generator 3 generates a contact signal con_sig representing a delay time-difference between the first and second signals sig1 and sig2.

In the present invention, the object may be one selected from all materials having charge accumulation characteristics i.e., a predetermined capacitance, typically a human body that can accumulate a large quantity of charges.

Figure 4:
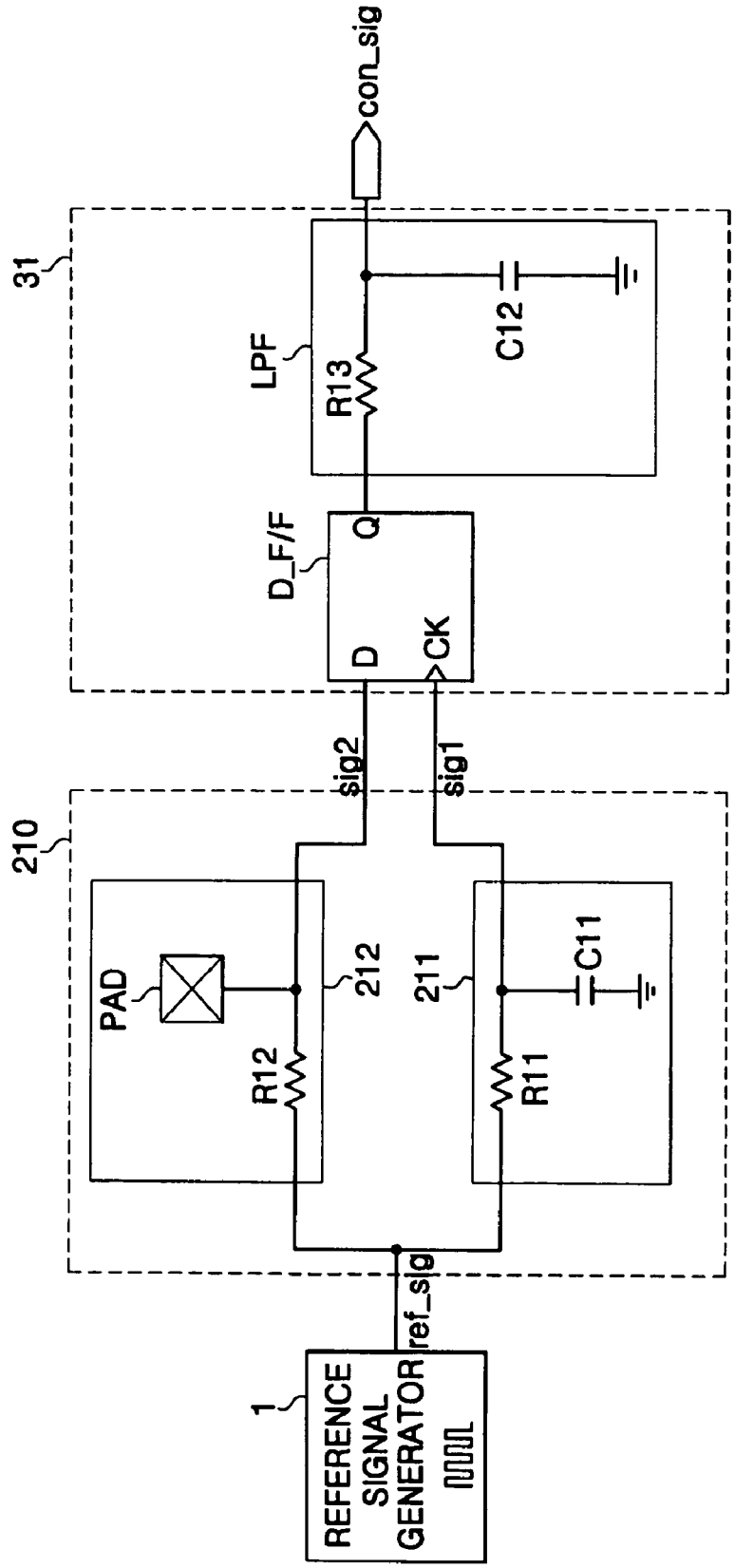
FIG. 4 is a circuit diagram illustrating an embodiment of the electrical touch sensor of FIG. 3.

FIG. 4 is a circuit diagram illustrating a first embodiment of the electrical touch sensor of FIG. 3.

Referring to FIG. 4, the electrical touch sensor of the present invention includes a reference signal generator 1, a touch detection part 210 having first and second signal generators 211 and 212, and a contact signal generator 31.

The first signal generator 211 includes a first resistor R11 disposed between a reference signal generator 1 and a contact signal generator 31, and a first capacitor C11 disposed between the first resistor R11 and the contact signal generator 31 and connected to a ground voltage VGND. The second signal generator 212 includes a second resistor R12 disposed between the reference signal generator 1 and the contact signal generator 31, and a touch pad PAD disposed between the second resistor R12 and the contact signal generator 31 and connected through an individual signal line. The contact signal generator 31 includes a D-flip/flop D_F/F, and a low-band pass filter LPF having a third resistor R13 and a capacitor C12.

At this time, the first and second resistors R11 and R12 allow a delay component between the reference signal generator 1 and the first capacitor C11 and a delay component between the reference signal generator 1 and the touch pad PAD to be equal, and have a very small value. The first capacitor C11 has a capacitance smaller than that of the object. That is, the first capacitor C11 has a capacitance smaller than an average capacitance of a human body.

Hereinafter, an operation of the electrical touch sensor of FIG. 4 will be described in conjunction with FIGS. 5A to 5D.

Figure 5A:
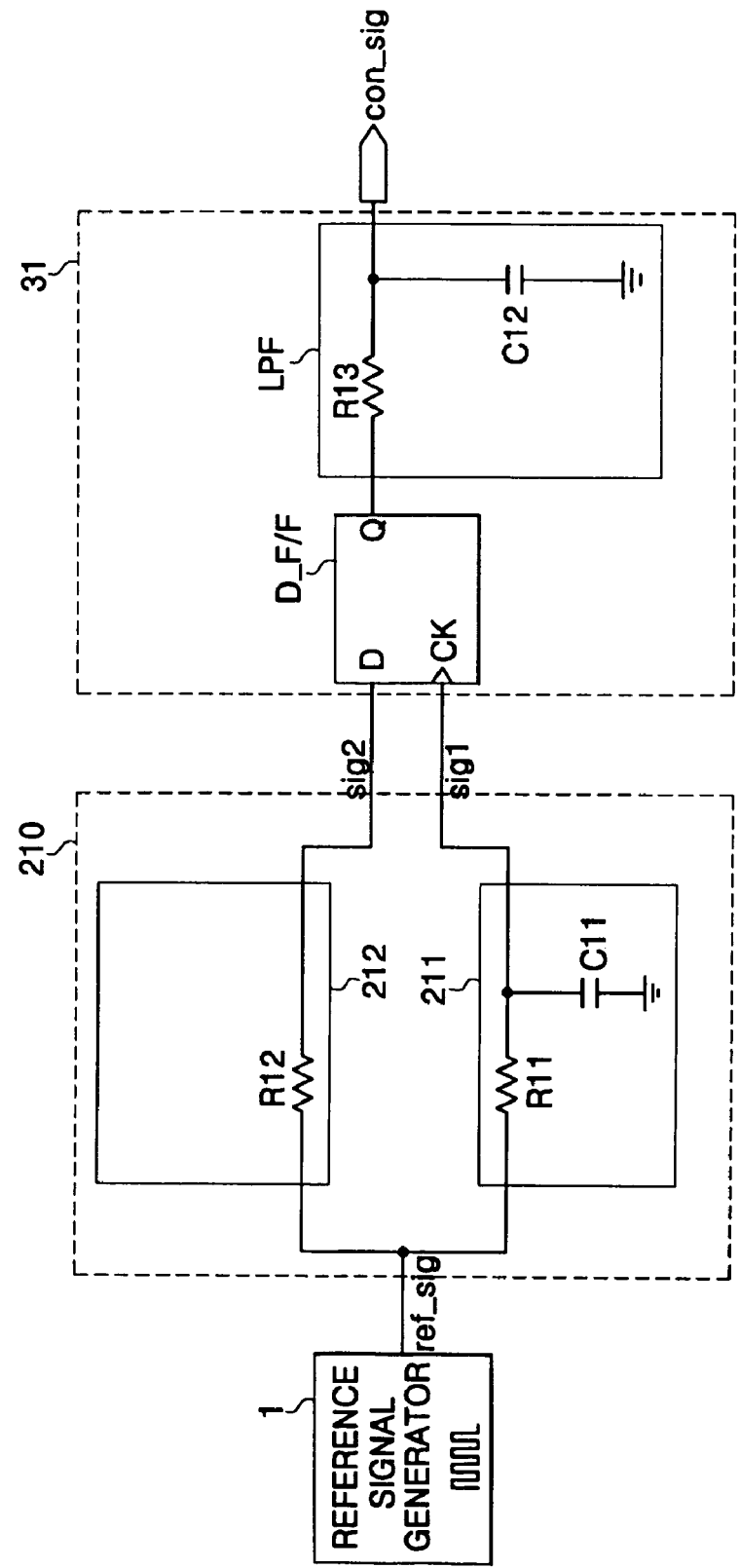
FIG. 5A is an operating circuit diagram illustrating the electrical touch sensor of FIG. 4, when an object is not in contact with the sensor.
Figure 5B:
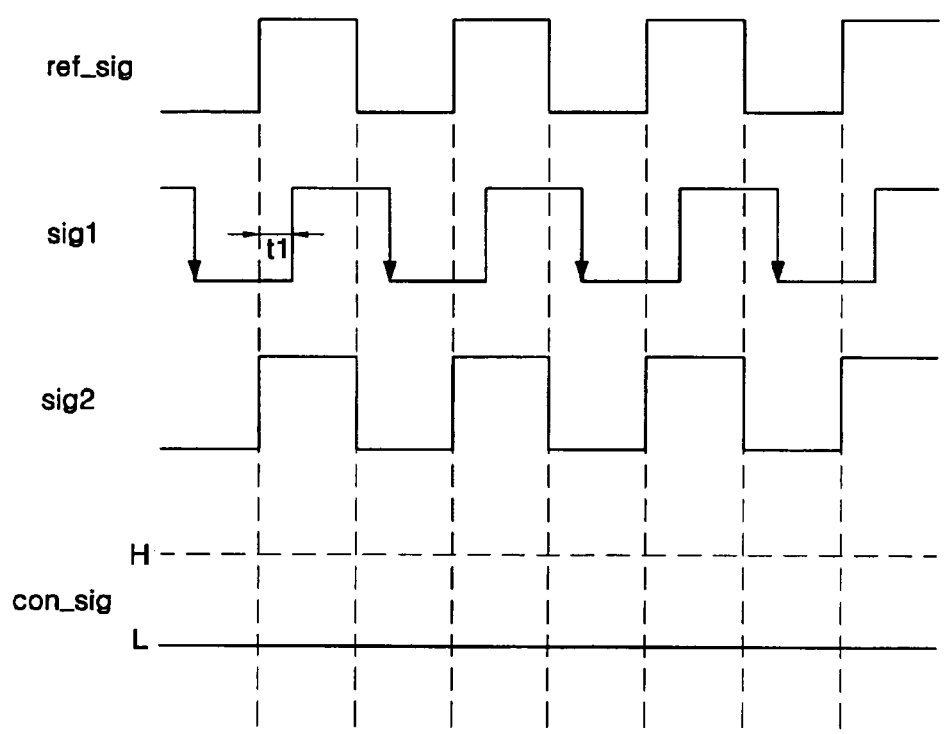
FIG. 5B is a view illustrating a signal waveform of the electrical touch sensor of FIG. 4, when an object is not in contact with the sensor.
Figure 5C:
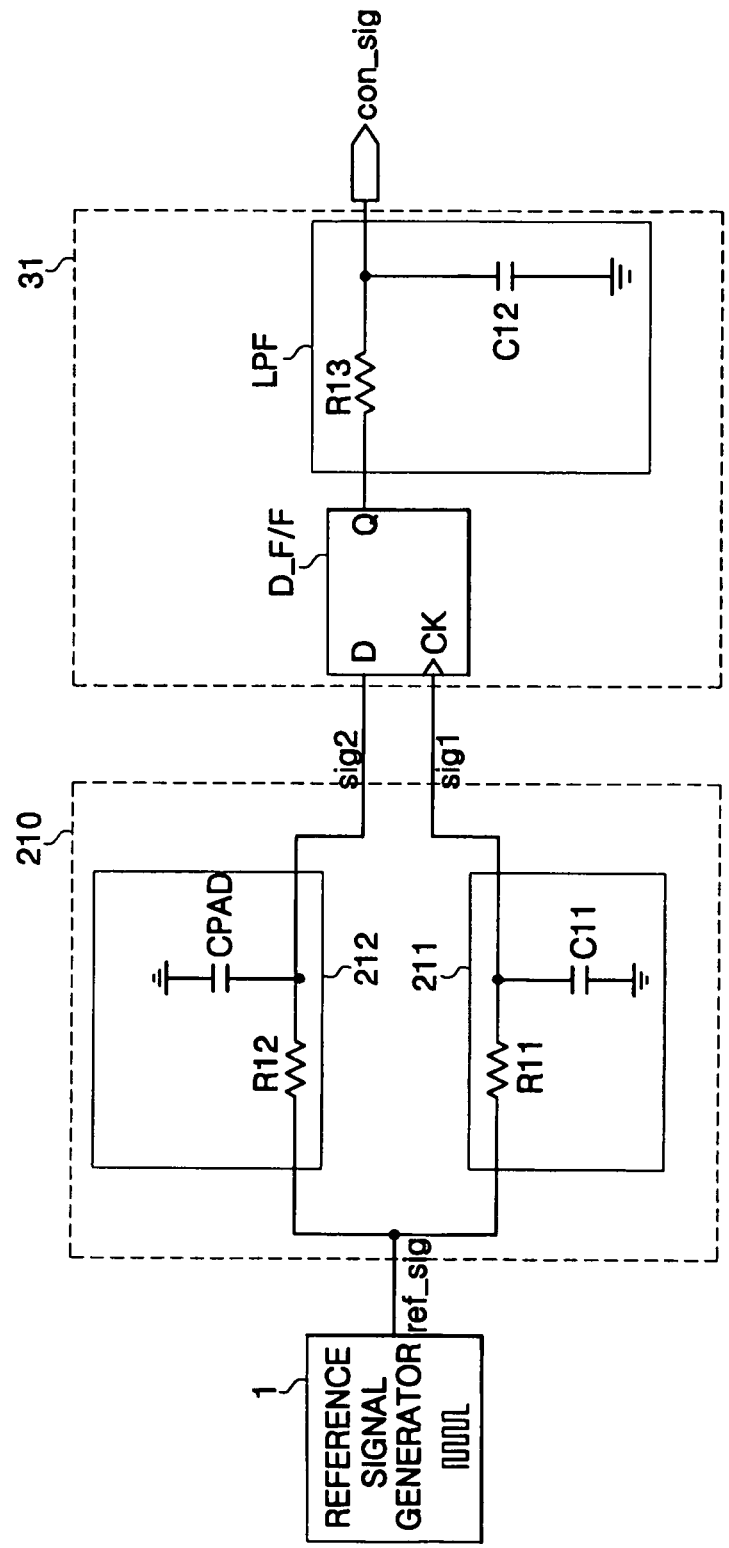
FIG. 5C is an operating circuit diagram illustrating the electrical touch sensor of FIG. 4, when an object is in contact with the sensor.
Figure 5D:
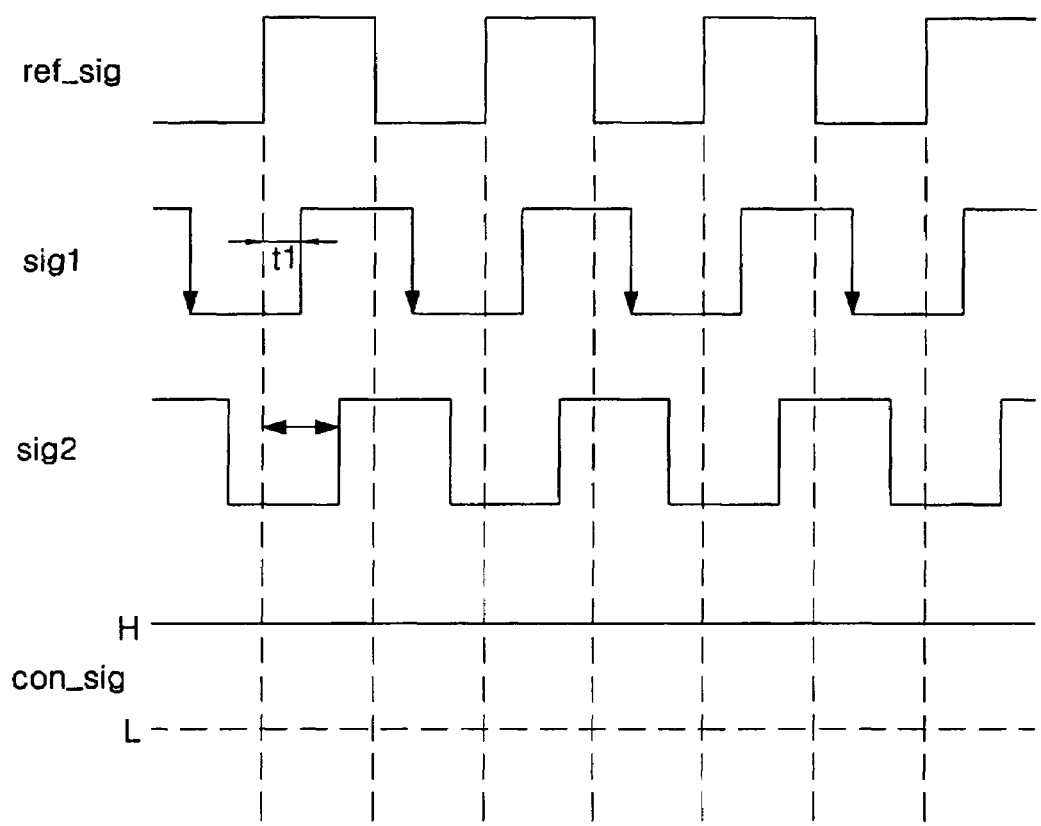
FIG. 5D is a view illustrating a signal waveform of the electrical touch sensor of FIG. 4, when an object is in contact with the sensor.

FIG. 5A is an operating circuit diagram illustrating the electrical touch sensor, when an object is not in contact with the sensor, FIG. 5B is a view illustrating a signal waveform of the electrical touch sensor of FIG. 5A, when an object is not in contact with the sensor, FIG. 5C is an operating circuit diagram illustrating the electrical touch sensor, when an object is in contact with the sensor, and FIG. 5D is a view illustrating a signal waveform of the electrical touch sensor of FIG. 5C, when an object is in contact with the sensor.

First, it will be described when the object is not in contact with the touch pad PAD.

Referring to FIG. 5A, when the object is not in contact with the touch pad PAD, a delay component of the first signal generator 211 becomes the first resistor R11 and the first capacitor C11, and a delay component of the second signal generator 212 becomes the second resistor R12.

Therefore, as shown in FIG. 5B, the first signal generator 211 generates the first signal sig1 by delaying the reference signal ref_sig through the first capacitor C11 by the first time t1, and the second signal generator 212 transmits the reference signal ref_sig as it is to generate the second signal sig2. That is, the touch detection part 210 generates the second signal sig2 delayed shorter than the first signal sig1.

The D-filp/flop D_F/F is synchronized to a lowering edge of the first signal sig1 to latch the second signal sig2 to generate a low level of contact signal con_sig, and the low-band pass filter LPF stabilizes and smoothes the low level of contact signal con_sig, and then outputs the contact signal con_sig to the exterior.

Hereinafter, it will be described when the object is in contact with the touch pad PAD.

Referring to FIG. 5C, when the object is in contact with the touch pad PAD, a delay component of the first signal generator 211 becomes the first resistor R11 and the first capacitor C11, and a delay component of the second signal generator 212 becomes the second resistor R12 and a third capacitor CPAD.

The third capacitor CPAD is a capacitor generated by a capacitance of the object in contact with the touch pad PAD, and has a capacitance larger than that of the first capacitor C11, as described above.

Therefore, as shown in FIG. 5D, the first signal generator 211 generates the first signal sig1 by delaying the reference signal ref_sig through the first capacitor C11 by the first time t1, and the second signal generator 212 to generate the second signal sig2 by delaying the reference signal ref_sig through the third capacitor CPAD by a time longer than the first time t1. That is, the touch detection part 210 generates the second signal sig2 delayed longer than the first signal sig1.

The D-filp/flop D_F/F is synchronized to the lowering edge of the first signal sig1 to latch the second signal sig2 to generate a high level of contact signal con_sig, and the low-band pass filter LPF stabilizes and smoothes the high level of contact signal con_sig, and then outputs the contact signal con_sig to the exterior.

Figure 6:
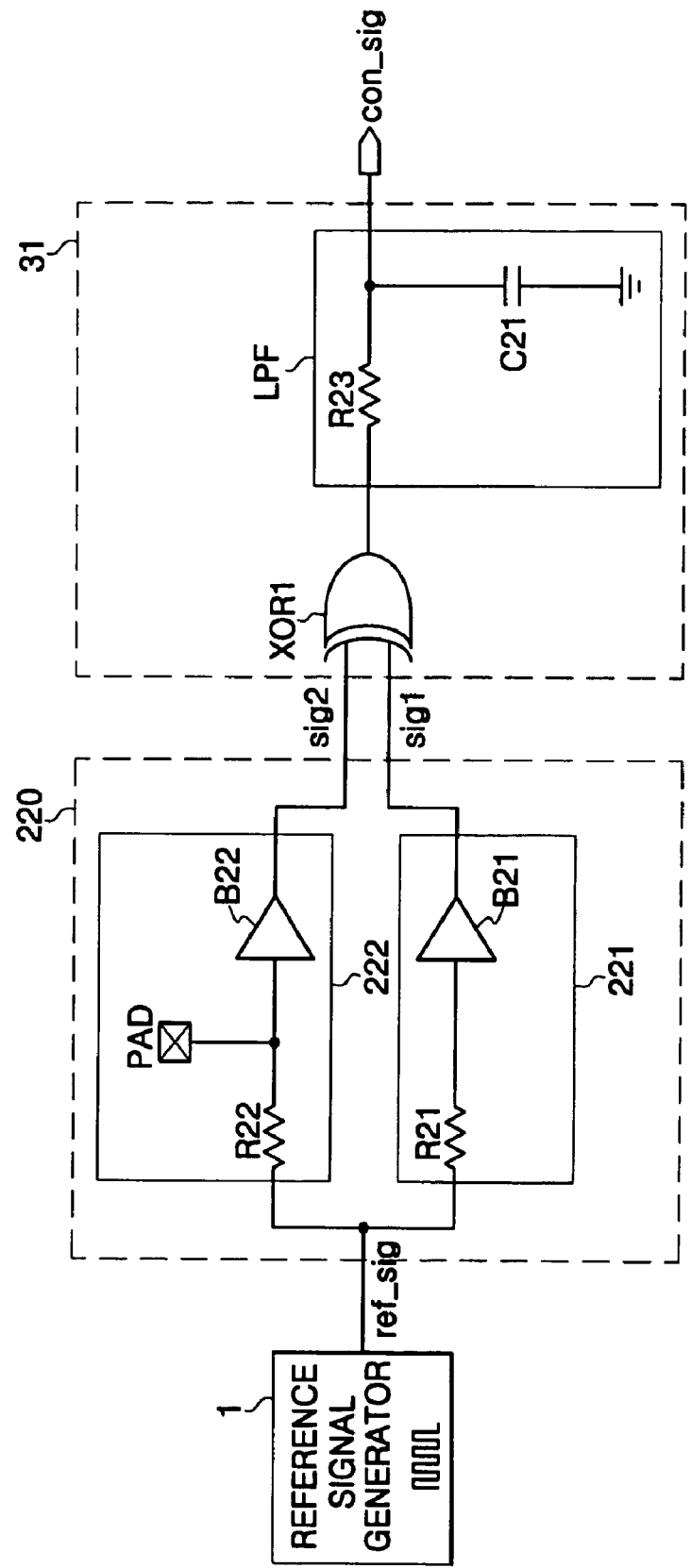
FIG. 6 is a circuit diagram illustrating another embodiment of the electrical touch sensor of FIG. 3.

FIG. 6 is a circuit diagram illustrating a second embodiment of the electrical touch sensor of FIG. 3.

Referring to FIG. 6, the electrical touch sensor of the present invention includes a reference signal generator 1, a touch detection part 220 having first and second signal generators 221 and 222, and a contact signal generator 32.

Referring to FIG. 6, a first signal generator 221 includes a first resistor R21 and a first input buffer B21 connected in series to a reference signal generator 1; a second signal generator 222 includes a second resistor R11 and a second input buffer B22 connected in series to the reference signal generator 1, and a touch pad PAD disposed between the second resistor R22 and the second input buffer B22 and connected through an individual signal line; and a contact signal generator 32 includes an exclusive OR device XOR1 for exclusively logically summing output signals sig1 and sig2 of the first and second input buffers B21 and B22, and a low-band pass filter LPF having a third resistor R23 and a capacitor C21.

At this time, the first and second R21 and R22 allows a delay component between the reference signal generator 1 and the first input buffer B21 and a delay component between the reference signal generator 1 and the second input buffer B22 to be equal. And, the delay components are a very small value.

Hereinafter, an operation of the electrical touch sensor of FIG. 6 will be described in conjunction with FIGS. 7A to 7D.

Figure 7B:
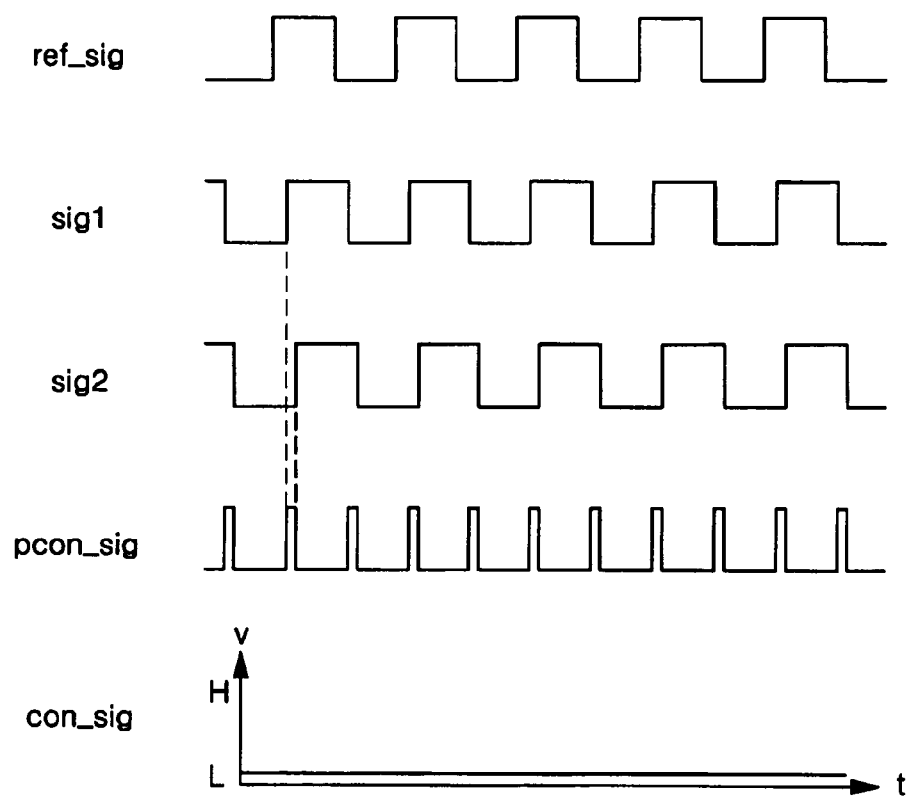
FIG. 7B is a view illustrating a signal waveform of the electrical touch sensor of FIG. 6, when an object is not in contact with the sensor.
Figure 7C:
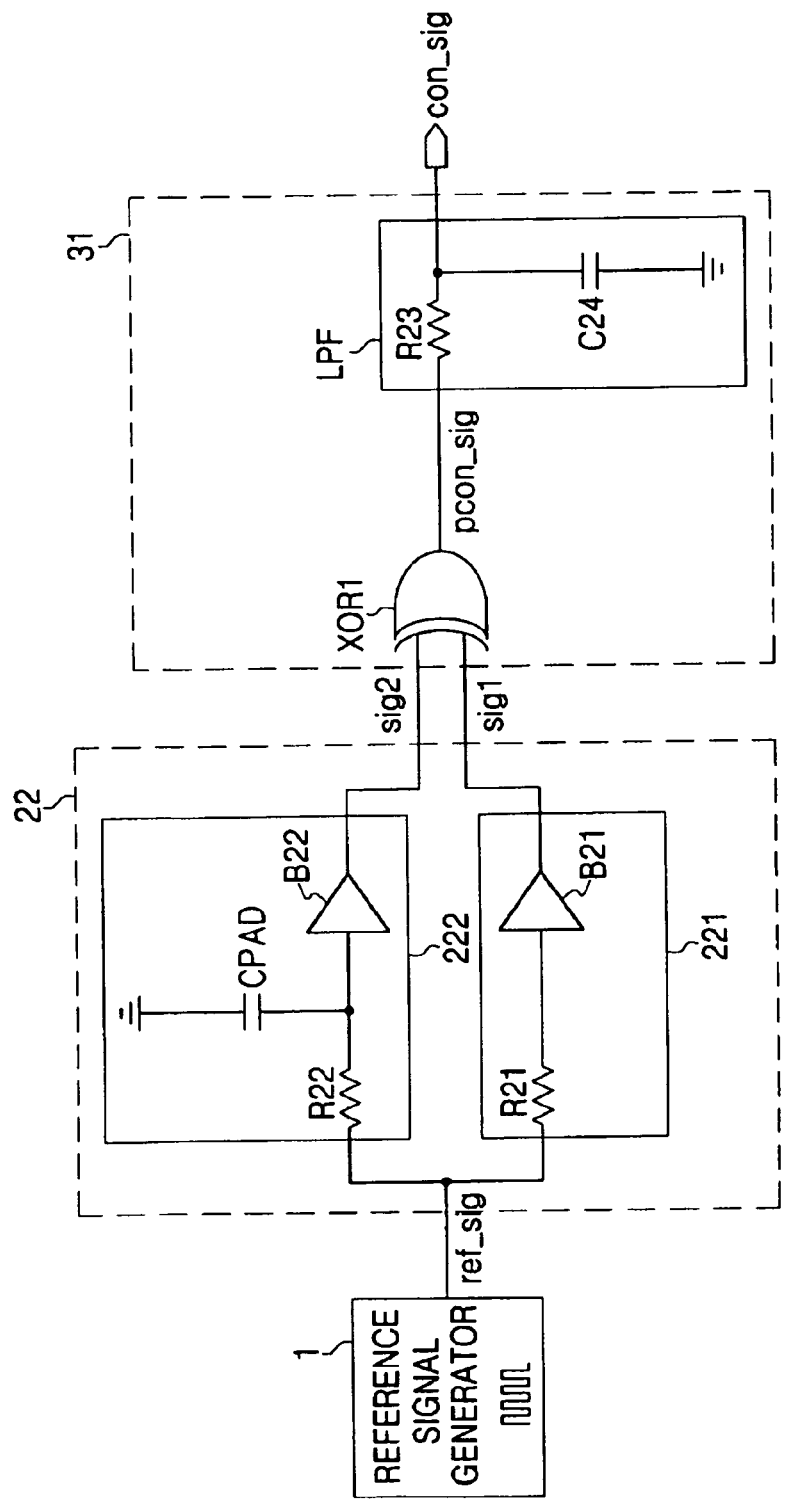
FIG. 7C is an operating circuit diagram illustrating the electrical touch sensor of FIG. 6, when an object is in contact with the sensor.
Figure 7D:
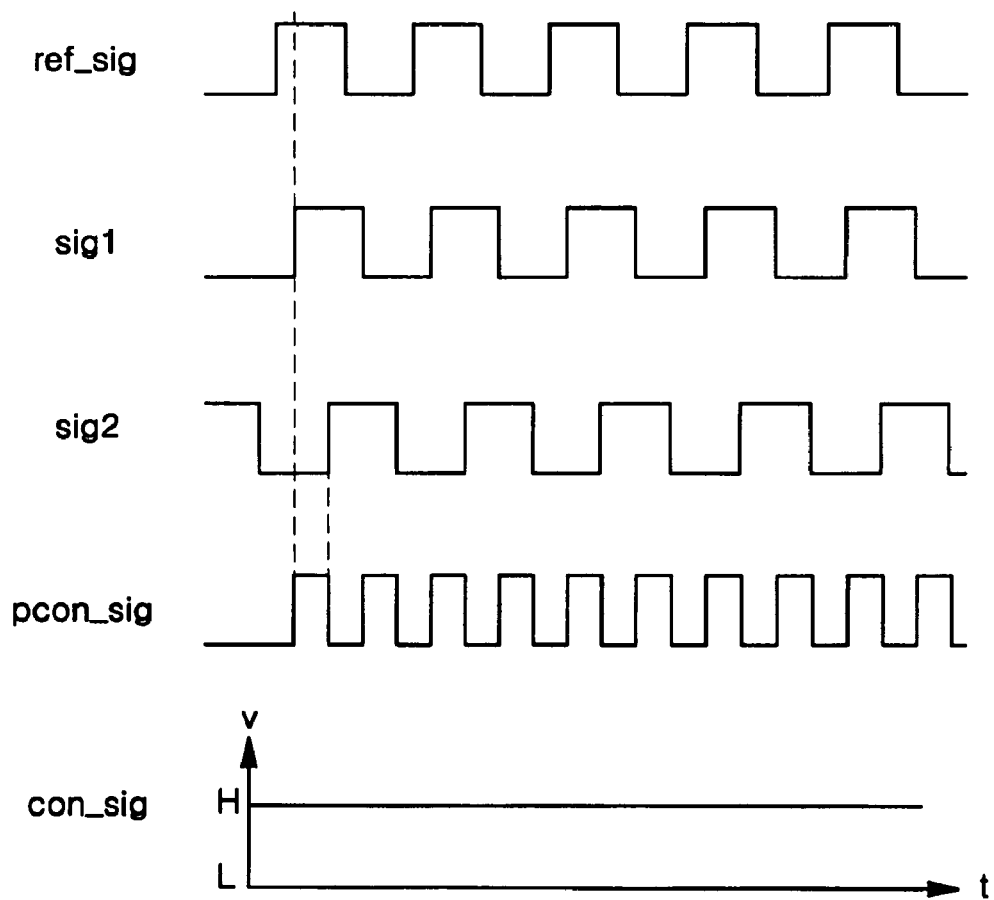
FIG. 7D is a view illustrating a signal waveform of the electrical touch sensor of FIG. 6, when an object is in contact with the sensor.

FIG. 7A is an operating circuit diagram illustrating the electrical touch sensor, when an object is not in contact with the sensor, FIG. 7B is a view illustrating a signal waveform of the electrical touch sensor of FIG. 7A, when an object is not in contact with the sensor, FIG. 7C is an operating circuit diagram illustrating the electrical touch sensor, when an object is in contact with the sensor, and FIG. 7D is a view illustrating a signal waveform of the electrical touch sensor of FIG. 7C, when an object is in contact with the sensor.

First, it will be described when the object is not in contact with the touch pad PAD.

At this time, the first and second resistors R21 and R22 allow a delay component between the reference signal generator 1 and the first input buffer B21 and a delay component between the reference signal generator 1 and the second input buffer B22 to be equal, and have a minor delay component.

Referring to FIG. 7A, when the object is not in contact with the touch pad PAD, a delay component of the first signal generator 221 becomes the first resistor R21 and the first input buffer B21, and a delay component of the second signal generator 222 becomes the second resistor R22.

Therefore, as shown in FIG. 7B, the first input buffer B21 of the first signal generator 221 generates the first signal sig1 delayed by the first time t1 by receiving and buffering the reference signal ref_sig delayed through the first resistor R21, and the second input buffer B22 of the second signal generator 222 generates the second signal sig2 delayed by the first time t1 by receiving and buffering the reference signal ref_sig delayed through the second resistor R22. That is, the touch detection part 220 generates the first and second signals sig1 and sig2 having a very small delay time-difference or no delay time-difference. While the touch detection part 220 should generate the first and second signals sig1 and sig2 having no delay time-difference, actually, as shown in FIG. 7B, the first and second signals sig1 and sig2 having a very small delay time-difference are more frequently generated.

The exclusive OR device XOR1 receives and logically sums the first and second signals sig1 and sig2 outputted from the first and second input buffers B21 and B22 to generate a lower level of signal when voltage levels of the two signals are equal, and to generate a high level of signal when voltage levels of the two signals are different. That is, the exclusive OR device XOR1 generates output signal pcon-sig having no pulse width or a very small pulse width depending on a delay time-difference between the first and second signals sig1 and sig2.

The capacitor C21 of the low-band pass filter LPF charges electric charges depending on a pulse width of an output signal pcon-sig of the exclusive OR device XOR1 transmitted through the resistor R23 to generate the contact signal con_sig having a voltage corresponding to a minor voltage, i.e., a low level of voltage.

Hereinafter, an operation of the electrical touch sensor will be described in conjunction with FIGS. 7C and 7D, when the object is in contact with the touch pad PAD.

Referring to FIG. 7C, when the object is in contact with the touch pad PAD, a delay component of the first signal generator 221 becomes the first resistor R21 and the first input buffer B21, and a delay component of the second signal generator 222 becomes the second resistor R22 and a second capacitor CPAD.

At this time, the second capacitor CPAD is a capacitor generated by a capacitance of the object in contact with the touch pad PAD.

Therefore, as shown in FIG. 7D, the first input buffer B21 of the first signal generator 221 generates the first signal sig1 delayed by the first time t1 by receiving and buffering the reference signal ref_sig delayed through the first resistor R21, and the second input buffer B22 of the second signal generator 222 generates the second signal sig2 delayed by a time longer than the first time t1 by receiving and buffering the reference signal ref_sig delayed through the second resistor R22 and the second capacitor CPAD. That is, the touch detection part 220 generates the first and second signals sig1 and sig2 having a large delay time-difference.

More specifically, the second input buffer B22 receives the reference signal ref_sig delayed by "1/(R21×CPAD)" through the second resistor R22 and the second capacitor CPAD, and buffers it to generate the second signal sig2.

The exclusive OR device XOR1 receives the first and second signals sig1 and sig2 outputted from the first and second input buffers B21 and B22 and exclusively logically sums voltage levels of the two signals sig1 and sig2 to generate a lower level of signal when voltage levels of the two signals are equal, and to generate a high level of signal when voltage levels of the two signals are different. That is, the exclusive OR device XOR1 generates output signal pcon-sig having a large pulse width depending on a delay time-difference between the first and second signals sig1 and sig2.

The capacitor C21 of the low-band pass filter LPF charges electric charges depending on a large pulse width of an output signal pcon-sig of the exclusive OR device XOR1 transmitted through the resistor R23 to generate the contact signal con_sig having a high level of voltage.

As described above, the electrical touch sensors of the embodiments in accordance with the present invention uses a theory that a time delay is generated in an AC signal having a delay component increased by a capacitance CPAD of the object, when the object is in contact with one touch pad PAD.

Therefore, the electrical touch sensor in accordance with the present invention detects contact or non-contact of the object using only one touch pad PAD, and generates electrical signals depending on whether the object is in contact with one touch pad PAD.

In addition, if necessary, the electrical touch sensors in accordance with the embodiments of the present invention may further includes touch pads for increasing a delay component of the second signal generators (212, 222).

For example, when the object is in contact with one touch pad, a delay component by the touch pad becomes "a capacitance of the object, but, when the object is in contact with n touch pads, a delay component by the touch pads become "a capacitance of the object×n".

Figure 8:
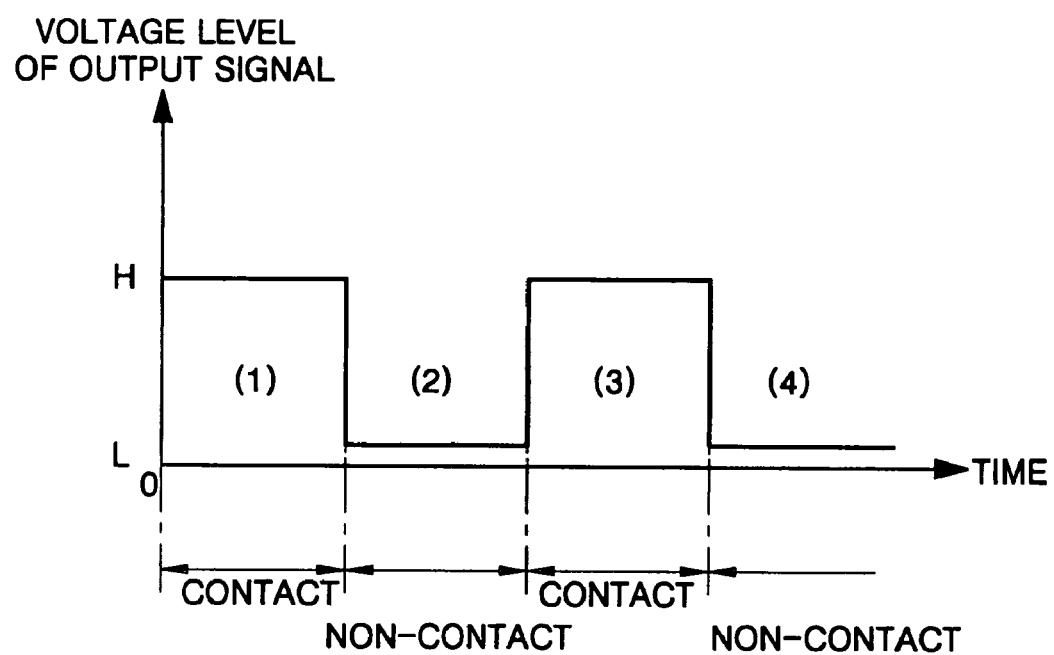
FIG. 8 is a view illustrating output level variations of the electrical touch sensor of FIG. 6, when an object is in contact with the sensor or not.

FIG. 8 is a view illustrating output level variations of the electrical touch sensor of FIG. 6, when an object is in contact with the sensor or not. It is appreciated that a high level of signal is generated as sections (1) and (3) when the object is not in contact with the electrical touch sensor, and a low level of signal is generated as sections (2) and (4) when the object is in contact with the electrical touch sensor.

At this time, when the object is a human body, his capacitance may be little different from one another. When a man's hand having a large capacitance is in contact with the touch pad, the electrical touch sensor of the present invention generates an output signal having a large voltage difference, thereby allowing the electrical touch sensor to perform a stable operation. However, when a man's hand having a small capacitance is in contact with the touch pad, the electrical touch sensor of the present invention generates an output signal having a small voltage difference, thereby disturbing a stable operation of the electrical touch sensor.

Figure 9:
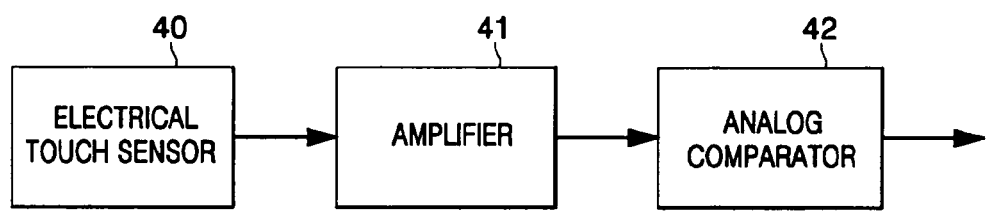
FIG. 9 is a view illustrating an embodiment of a digital signal generation device additionally installed at the electrical touch sensor of FIG. 6.

Therefore, the present invention additionally provides an individual circuit to the electrical touch sensor of FIG. 6 to help the electrical touch sensor of FIG. 9 to always perform a stable operation.

FIG. 9 is a view illustrating a first embodiment of a digital signal generation device additionally installed at the electrical touch sensor of FIG. 6, which further include an amplifier 41 and an analog comparator 42, in addition to the electrical touch sensor 40 of the present invention.

The amplifier 41 receives a contact signal con-sig the electrical touch sensor 40, and amplifies the contact signal to a certain extent such that the analog comparator 42 can detect a voltage difference between the contact signals when the object is in contact with the pad and when not in contact with the pad. The analog comparator 42 compares the contact signal of the amplifier 41 with a reference voltage thereof to generate a high level of signal when a voltage of the contact signal is higher than the reference voltage, and to generate a low level of signal when a voltage of the contact signal is lower than the reference voltage.

At this time, the amplifier 41 employs a variable gain amplifier to adjust a gain according to an external control operation. In addition, the analog comparator 42 can also adjust a reference voltage according to the external control operation.

Figure 10:
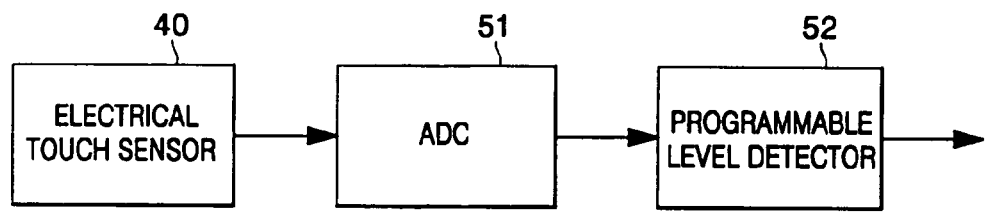
FIG. 10 is a view illustrating another embodiment of a digital signal generation device additionally installed at the electrical touch sensor of FIG. 6.

FIG. 10 is a view illustrating a second embodiment of a digital signal generation device additionally installed at the electrical touch sensor of FIG. 6, which further include an analog-digital converter (ADC) 51, and a programmable level detector 52, in addition to the electrical touch sensor 40 of the present invention.

The analog-digital converter 51 receives a contact signal con-sig the electrical touch sensor 40 of FIG. 6, and converts the received signal to a predetermined bit of digital signal. The programmable level detector compares a reference digital signal with the predetermined bit of digital signal provided from the analog-digital converter 51 to generate a high level of signal when the predetermined bit of digital signal is larger than the reference digital signal, and to generate a low level of signal when smaller than the reference digital signal.

At this time, the programmable level detector 52 can adjust the reference digital signal for determining whether the signal is the high level or the low level according to an external control operation.

Figure 11:
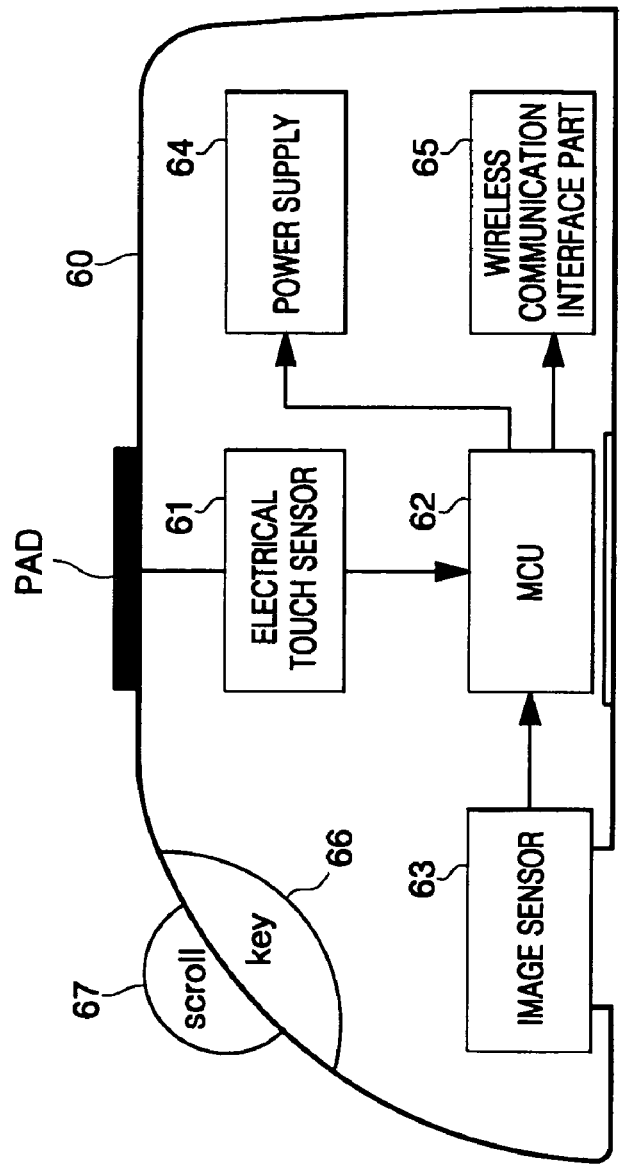
FIG. 11 is a view illustrating an embodiment of a mouse including the electrical touch sensor in accordance with the present invention.

FIG. 11 is a view illustrating an embodiment of a mouse including the electrical touch sensor in accordance with the present invention.

Referring to FIG. 11, the mouse 60 includes a touch pad installed on the mouse 60, an electrical touch sensor 61 for detecting whether an object is in contact with the touch pad to inform the detected result, a power supply 64 for generating an operating power of the mouse, a micro controller unit (MCU) 62 for activating an operation of the mouse and the power supply 64 only when it is informed that the object is in contact with the touch pad, an image sensor 63 calculating a movement value of the mouse by image-processing an image of the obtained object, a wireless communication interface part 65 for interfacing data between the MCU 62 and a computer, a key button for detecting and informing a selection operation of a button, and a scroll device 67 for detecting and informing an scroll operation.

A user's hand should be in contact with an upper surface of the mouse in order to use the mouse 60.

Figure 12:
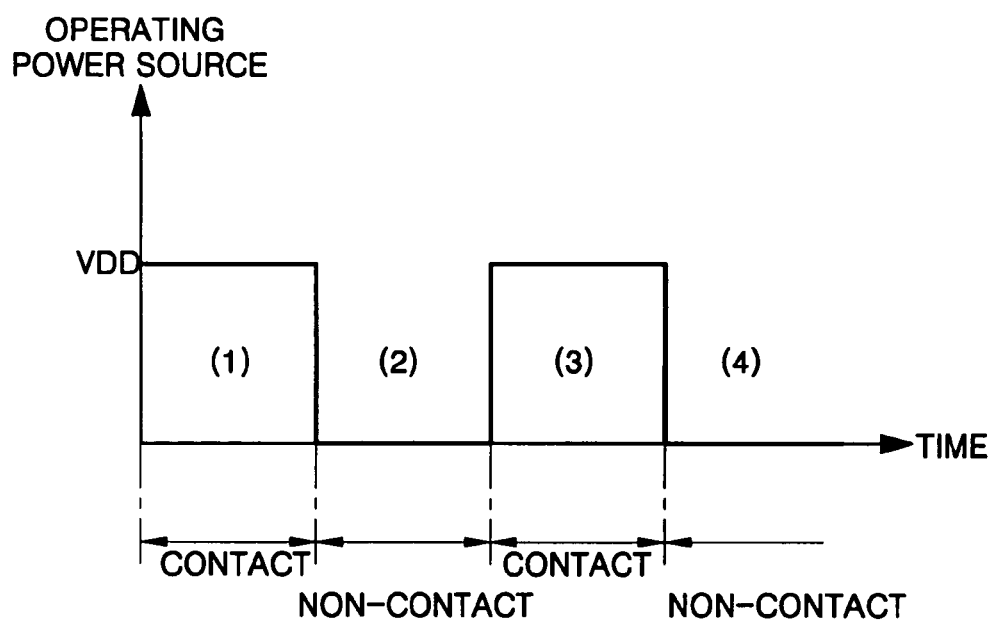
FIG. 12 is a view illustrating a method of controlling an operation power source of the mouse of FIG. 12.

Therefore, as shown in FIG. 12, the mouse 60 activates an operation of the power supply 64 only when it is informed from the electrical touch sensor 61 that the human's hand is in contact with the upper surface of the mouse (sections (1) and (3)), to supply an operating power to the respective components, thereby activating an operation of the mouse.

When the mouse 60 of FIG. 11 is a wireless mouse, it is most important to optimally reduce power consumption since a rechargeable battery or a no rechargeable battery is used as a power source to restrict an operating time. Therefore, the mouse 60 of the present invention provides the operating power to the respective components to activate the mouse only when a man uses the mouse 60 to prevent waste of the power source, thereby remarkably extending the operating time of the wireless mouse 60.

While the electrical touch sensor is described to be adaptable to a device such as a mouse, mobile phone, MP3 player, and so on, any kind of human interface device may adapt the electrical touch sensor to be operated only when a man is in contact with the pad, in order to reduce power consumption.

Figure 13:
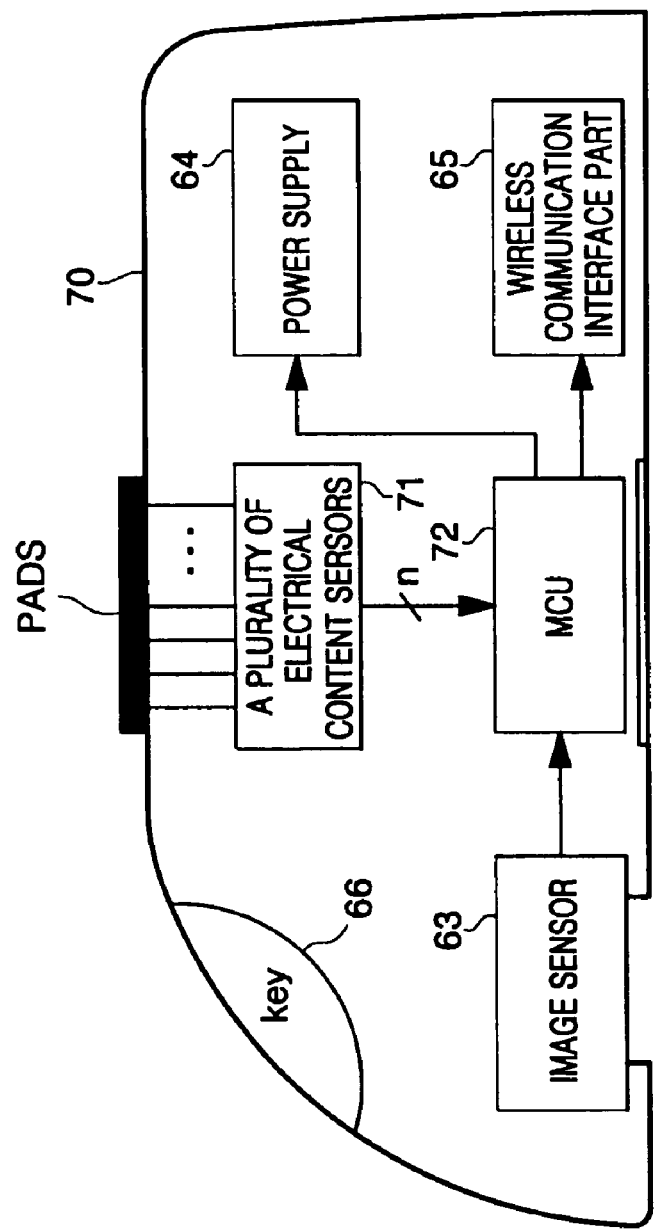
FIG. 13 is a view illustrating another embodiment of a mouse using the electrical touch sensor in accordance with the present invention.

FIG. 13 is a diagram illustrating another embodiment of a mouse having the electrical touch sensor in accordance with the present invention.

Referring to FIG. 13, the mouse 70 includes an image sensor 63, a power supply 64, a wireless communication interface 65, and a key button 66, similarly to the mouse 60 of FIG. 11, but the scroll device 67 and the MCU 62 are substituted with a plurality of electrical touch sensors 71, and an MCU 72 generating scroll data depending on signals transmitted from the plurality of electrical touch sensors 71.

Like reference numerals of FIGS. 12 and 13 designate elements having the same constitution and performing the same operation, and their descriptions will be omitted.

Figure 14:
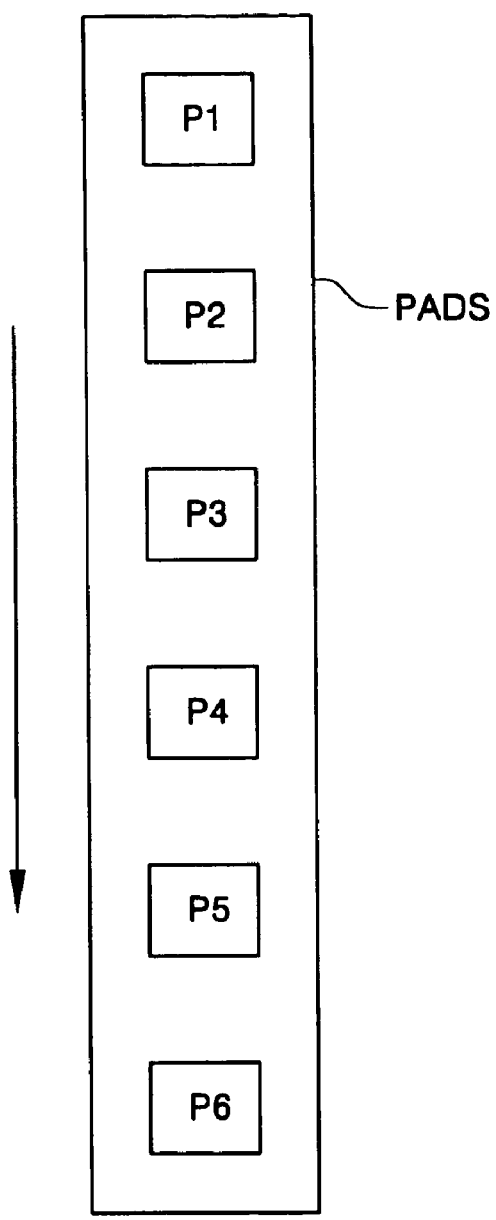
FIG. 14 is a view illustrating disposition of a touch pad of the electrical touch sensor of FIG. 13.

As shown in FIG. 14, the plurality of electrical touch sensors 71 have a predetermined pattern and are connected to a plurality of touch pads PADS disposed on the upper surface of the mouse 70 to implement an electrical scroll device, and inform contact positions of the object through a plurality of contact signals. At this time, each of the electrical touch sensors 71 generates a contact signal for detecting and informing whether the object is in contact with the touch pad PAD, similarly to the electrical touch sensor 61 of FIG. 11.

The MCU 72 stores scroll operating conditions and scroll direction information corresponding to the contact positions of the object, and performs a scroll operation using the plurality of electrical touch sensors 71. That is, when the MCU 72 receives contact signals satisfying the scroll operating conditions from the plurality of electrical touch sensors 71, the MCU 72 analyzes the contact signals to obtain scroll direction information corresponding to the contact positions of the object, and generates scroll data for scrolling a screen of a computer in the obtained scroll direction to provide the scroll data to the computer.

For example, in the case that the plurality of electrical touch sensors 71 of FIG. 13 include a plurality of touch pads P1 to P6 longitudinally disposed in series as shown in FIG. 14, when the object is in movable contact with the plurality of touch pads P1 to P6 in a downward direction (an arrow direction), the MCU 72 detects it through a plurality of contact signals of the plurality of electrical touch sensors 71, and generates scroll data for scrolling the screen of the computer downward.

In addition, if necessary, the MCU 72 may be used as a pointing and data selection device of the plurality of electrical touch sensors 71. For this purpose, the MCU 72 additionally stores pointing operating conditions, selection operating conditions, and coordinates information of a curser corresponding to positions of the plurality of touch pads PADS, and performs pointing and data selection operations using the plurality of electrical touch sensors 71.

That is, when the MCU 72 receives contact signals satisfying pointing operating conditions from the plurality of electrical touch sensors 71, the MCU 72 analyzes the contact signals to obtain coordinates information of a curser corresponding to the contact positions of the object, and generates pointing data for moving the curser of the computer to the obtained coordinates to provide it to the computer. In addition, when the MCU 72 receives contact signals satisfying selection operating conditions, the MCU 72 analyzes the contact signals to obtain coordinates of the curser corresponding to the contact positions of the object, and generates selection data for selecting icon and data displayed on the screen of the computer corresponding to the obtained coordinates to provide it to the computer.

As described above, since the electrical scroll device of the mouse 70 of FIG. 13 is composed of the plurality of electrical touch sensors including the plurality of touch pads, the electrical scroll device occupies a space smaller than that of the conventional mechanical scroll device, thereby enabling implement of a very slim mouse. In addition, it is possible to increase durability of the mouse by removing a frictional component.

Figure 15A:
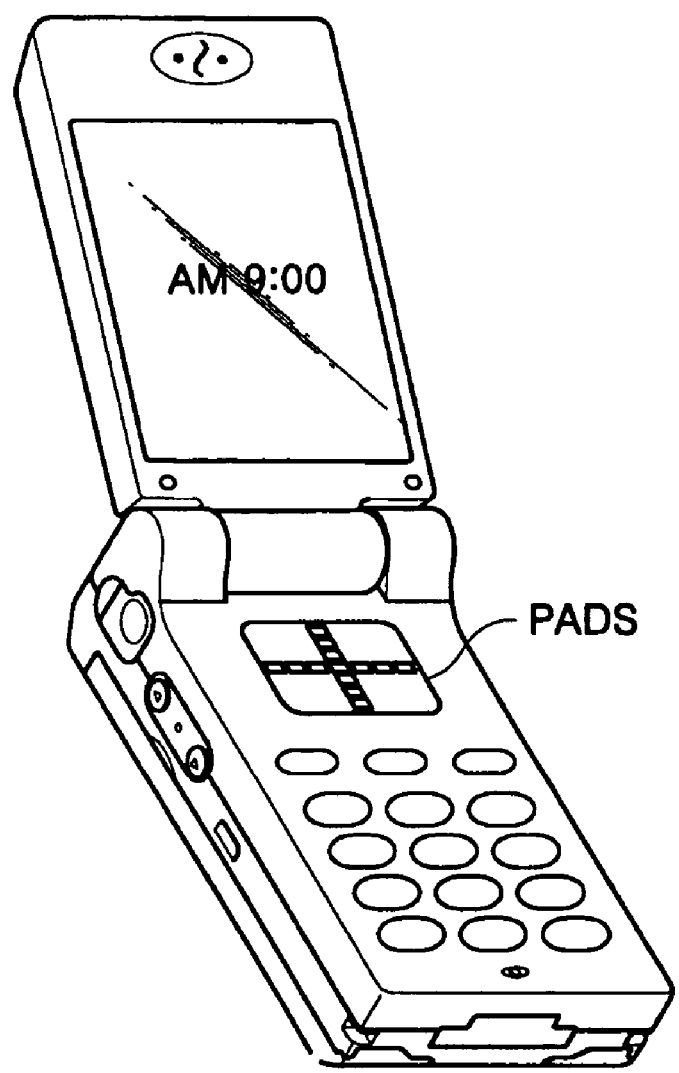
FIG. 15A is a view illustrating an embodiment of a portable device using the electrical touch sensor in accordance with the present invention.
Figure 15B:
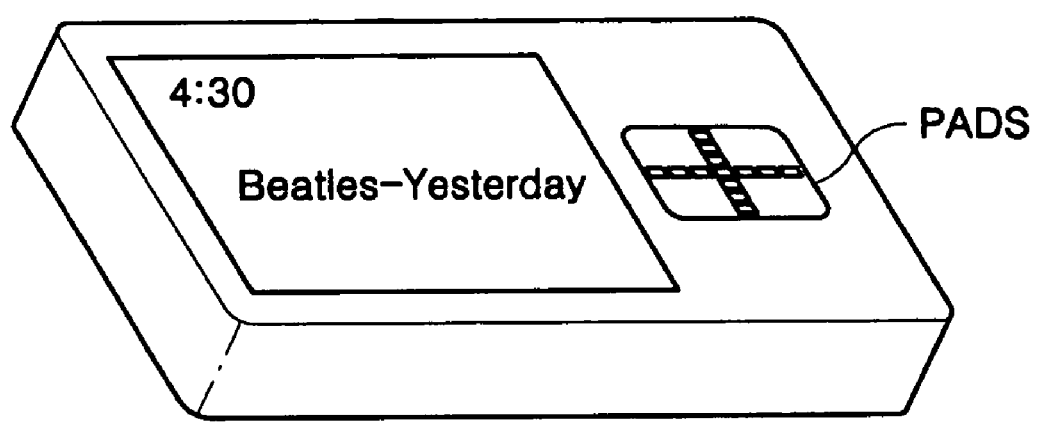
FIG. 15B is a view illustrating another embodiment of a portable device using the electrical touch sensor in accordance with the present invention.

Further, as shown in FIGS. 15A and 15B, the touch pads of the plurality of touch sensors of the present invention may be disposed at a predetermined region of a mobile phone or an MP3 player in a predetermined pattern to be used as a scroll device or a pointing and data selection device, using the same theory of FIG. 13.

As described above, since the electrical touch sensor of the present invention includes one touch pad to make its structure simple, the electrical touch sensor can be readily applicable to any human interface device utilizing whether the object is in contact with the touch pad, or whether contact positions of the plurality of touch pads are varied.

As can be seen from the foregoing, the electrical touch sensor of the present invention is capable of increasing operation reliability by precisely determining whether the object is in contact with the pad, when the object has charge accumulation characteristics more than a certain level, though its conductive is insufficient. As a result, it is possible to allow the electrical touch sensor to be stably operated, regardless of a humidity difference due to variable weather, a conductivity difference between human beings, whether a man wears a glove or the like, and so on.

In addition, the electrical touch sensor can determine whether the object is in contact with the pad using only one pad to reduce a layout area of a product.

Further, the human interface device of the present invention can provide improved various functions such as power supply control, scroll operation, and so on, using the electrical touch sensor.

While this invention has been described in connection with what is presently considered to be the most practical and preferred embodiment, it is to be understood that the invention is not limited to the disclosed embodiment, but on the contrary, it is intended to cover various modification within the spirit and the scope of the Invention, which is set forth in the appended claims.

What is claimed is:

1. An electrical touch sensor comprising:
    a touch detection part having at least one touch pad and generating a first signal having a same delay time regardless of whether an object is in contact with the touch pad and a second signal having a varied delay time according to whether the object is in contact with the touch pad; and
    a contact signal generator generating a contact signal in response to a delay time-difference between the first and second signals.

2. The electrical touch sensor according to claim 1, wherein the object has a predetermined capacitance.

3. The electrical touch sensor according to claim 1, further comprising a reference signal generator for providing a reference signal to the touch detection part.

4. The electrical touch sensor according to claim 3, wherein the touch detection part comprises:
    a first signal generator generating a first signal by delaying the reference signal by a first time; and
    a second signal generator having the touch pad and generating a second signal by delaying the reference signal by a time longer than the first time when the object is in contact with the touch pad, and by delaying the reference signal by a time shorter than the first time when not in contact with the touch pad.

5. The electrical touch sensor according to claim 4, wherein the first signal generator comprises a capacitor located between the contact signal generator and a ground voltage.

6. The electrical touch sensor according to claim 5, wherein the capacitor has a capacitance smaller than that of the object.

7. The electrical touch sensor according to claim 4, wherein the first signal generator comprises a buffer buffering the reference signal delayed by the first time to generate the first signal.

8. The electrical touch sensor according to claim 7, wherein the second signal generator comprises:
    the touch pad delaying the reference signal by the first time when the object is in not contact with the pad, and delaying the reference signal by a time longer than the first time when in contact with the pad; and
    a buffer generating the second signal by buffering the reference signal delayed by a time shorter than the first time when the object is not in contact with the pad, and buffering the reference signal by a time longer than the first time when in contact with the pad.

9. The electrical touch sensor according to claim 4, wherein the contact signal generator is a flip-flop device synchronized by the first signal to latch the second signal to generate the contact signal.

10. The electrical touch sensor according to claim 9, further comprising a filter stabilizing and smoothing the contact signal to output the contact signal.

11. The electrical touch sensor according to claim 4, wherein the contact signal generator comprises:
    a pulse signal generator generating an output signal having a pulse width corresponding to the delay time-difference between the first and second signals; and
    a DC voltage generator generating the contact signal whose a voltage is corresponding to the pulse width of the output signal of the pulse signal generator.

12. The electrical touch sensor according to claim 11, wherein the pulse signal generator is an exclusive OR device.

13. The electrical touch sensor according to claim 11, wherein the DC voltage generator is a low-band pass filter.

14. The electrical touch sensor according to claim 11, wherein the contact signal generator further comprises:
    an amplifier amplifying the contact signal to have a certain extent of voltage; and
    a comparator comparing the voltage of the output signal of the amplifier with a reference voltage to generate a logical value.

15. The electrical touch sensor according to claim 14, wherein the amplifier is a variable gain amplifier changing a gain in response to an external control operation.

16. The electrical touch sensor according to claim 14, wherein the reference voltage varies in response to an external control operation.

17. The electrical touch sensor according to claim 11, further comprising:
    a converter converting the contact signal to a predetermined bit of digital signal; and
    a comparator comparing the predetermined bit of digital signal with a reference digital signal to generate a logical value.

18. The electrical touch sensor according to claim 17, wherein the reference digital signal varies in response to an external control operation.

19. A human interface device comprising:
- at least one electrical touch sensor having a touch pad and generating a contact signal depending on whether an object is in contact with the touch pad; and
- a controller performing a control operation in response to the contact signal,
- wherein the at least one electrical touch sensor comprises:
- a touch detection part having at least one touch pad and changing a delay time-difference between first and second signals depending on whether the object is in contact with the touch pad; and
- a contact signal generator generating a contact signal in response to the delay time-difference between the first and second signals.

20. A human interface device according to claim 19, further comprising:
- a display part displaying data on a screen, wherein the electrical touch sensors are disposed in a predetermined pattern and generating at least one contact signal when an object is in contact with at least one touch pad of the touch pads, and
- wherein the controller analyzes the contact signal to detect positions of the touch pads in contact with the object, and scrolls the screen in a direction corresponding to the positions of the touch pads.

21. The human interface device according to claim 20, wherein the controller further comprises functions of additionally storing coordinates information corresponding to the contact positions of the object, obtaining the coordinates information corresponding to the contact positions of the object according to the plurality of contact signals, and selecting data displayed on a certain region of a screen according to the coordinates information.

22. The human interface device according to claim 20, wherein the controller further comprises functions of additionally storing coordinates information corresponding to the contact positions of the object, obtaining the coordinates information corresponding to the contact positions of the object according to the plurality of contact signals, and pointing a certain region of a screen according to the coordinates information.

23. The human interface device according to claim 19, wherein the controller performs a power control operation in response to the contact signal.

* * * * *